(12) United States Patent
Huber

(10) Patent No.: US 6,584,551 B1
(45) Date of Patent: Jun. 24, 2003

(54) SYSTEM AND METHOD FOR AUTOMATIC DYNAMIC EXPANSION OF A SNAPSHOT REPOSITORY

(75) Inventor: Robin Huber, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 142 days.

(21) Appl. No.: 09/723,095

(22) Filed: Nov. 27, 2000

(51) Int. Cl.[7] ................................................. G06F 12/16
(52) U.S. Cl. ........................................ 711/162; 711/171
(58) Field of Search ................................. 707/202, 204, 707/205; 711/161, 162, 170, 171

(56) References Cited

U.S. PATENT DOCUMENTS

| | | | |
|---|---|---|---|
| 6,131,148 A | * | 10/2000 | West et al. ................. 711/162 |
| 6,182,198 B1 | * | 1/2001 | Hubis et al. ................ 711/162 |
| 6,311,193 B1 | * | 10/2001 | Sekido ........................ 707/202 |
| 6,330,570 B1 | * | 12/2001 | Crighton ..................... 707/204 |
| 6,341,341 B1 | * | 1/2002 | Grummon et al. .......... 711/162 |

* cited by examiner

Primary Examiner—Gary Portka
(74) Attorney, Agent, or Firm—Suiter & Associates

(57) ABSTRACT

A system and method for dynamically expanding a snapshot repository based on predefined parameters is disclosed. The snapshot repository is monitored for determining if the amount of information stored in the snapshot repository has reached a predetermined volume increase threshold. If a determination is made that the volume increase threshold has been reached, the volume of the snapshot repository is automatically increased. The snapshot repository may also be monitored for determining if the amount of information stored in the snapshot repository has reached a predetermined maximum snapshot repository volume whereupon a warning may be provided.

14 Claims, 2 Drawing Sheets

SYSTEM AND METHOD FOR AUTOMATIC DYNAMIC EXPANSION OF A SNAPSHOT REPOSITORY

FIELD OF THE INVENTION

The present invention generally relates to the field of snapshot repositories utilized in memory or storage systems such as RAID (Redundant Array of Independent Disks) storage systems and the like, and more particularly to a method for automatically dynamically expanding a snapshot repository volume.

BACKGROUND OF THE INVENTION

Multiple drive storage systems such as RAID storage systems or the like commonly used by networked computing systems typically include a snapshot repository for storing a collection of information about the storage system. This collection of information, commonly referred to in the art as a "snapshot", allows data stored by the storage system in the event of failure thereby allowing substantially instant backup of data in the storage system. Snapshots are periodically saved to the snapshot repository as data stored in the storage system is altered so that the repository information is kept current.

Presently, when a user, such as the system administrator of the storage system, or the like, defines a repository for a snapshot, that user must specify the exact size of the repository volume (e.g., as a set amount of memory such as 30 GB (gigabytes)). However, this requirement forces the user to anticipate the write mix of the I/O (input/output) pattern to the base volume. In other words, if the repository runs out of space because too many write operations were performed to the base volume, the snapshot becomes invalid or fails. Should this event occur, user intervention is required to increase the size of the repository, or, alternately, to make the snapshot valid via other means.

Consequently, it would be desirable to provide a means of automatically and dynamically expanding the size of the snapshot repository volume based on user defined parameters.

SUMMARY OF THE INVENTION

Accordingly, the present invention is directed to a system and method for dynamically expanding a snapshot repository volume. In this manner, automatic scaling of the repository volume may be provided so that the exact initial size of the repository volume need not be known. Further, the snapshot repository may be allowed to grow with the usage pattern of the system while keeping the repository sized to a relatively small and appropriate level.

In accordance with a first aspect of the invention, a method for dynamically expanding a snapshot repository is disclosed. The method includes the steps of monitoring the snapshot repository for determining if the amount of information stored in the snapshot repository has reached a predetermined volume increase threshold. If a determination is made that the volume increase threshold has been reached, the volume of the snapshot repository is automatically increased. In an exemplary embodiment, the method also includes the steps of monitoring the snapshot repository for determining if the amount of memory utilized by information stored in the snapshot repository has reached a predetermined maximum snapshot repository volume threshold and providing a warning if the maximum snapshot repository volume threshold is reached. In this manner, the method allows the size of the repository volume to be automatically increased each time a predetermined volume increase threshold is reached up to a predetermined maximum volume.

In accordance with a second aspect of the invention, a system for storing a snapshot of a memory is disclosed. The system includes a snapshot repository suitable for storing the snapshot and a controller for controlling the snapshot repository. The controller is capable of monitoring the snapshot repository for determining if the amount of memory utilized by information stored in the snapshot repository has reached a predetermined volume increase threshold and increasing the volume of the snapshot repository if the volume increase threshold is determined to have been reached. The controller may further monitor the snapshot repository for determining if the amount of memory utilized by information stored in the snapshot repository has reached a predetermined maximum snapshot repository volume threshold and provide a warning if the maximum snapshot repository volume threshold is (or is about to be) reached.

In exemplary embodiments of the present invention, the expansion behavior of the snapshot directory may be specified at the time it is created. This may be accomplished by allowing a user, for example, the system administrator, to define such parameters as the initial size of the snapshot repository volume, the maximum size of the snapshot repository volume, the amount of incremental increase of the snapshot repository volume, the volume increase threshold, the maximum snapshot repository volume threshold, and the like.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
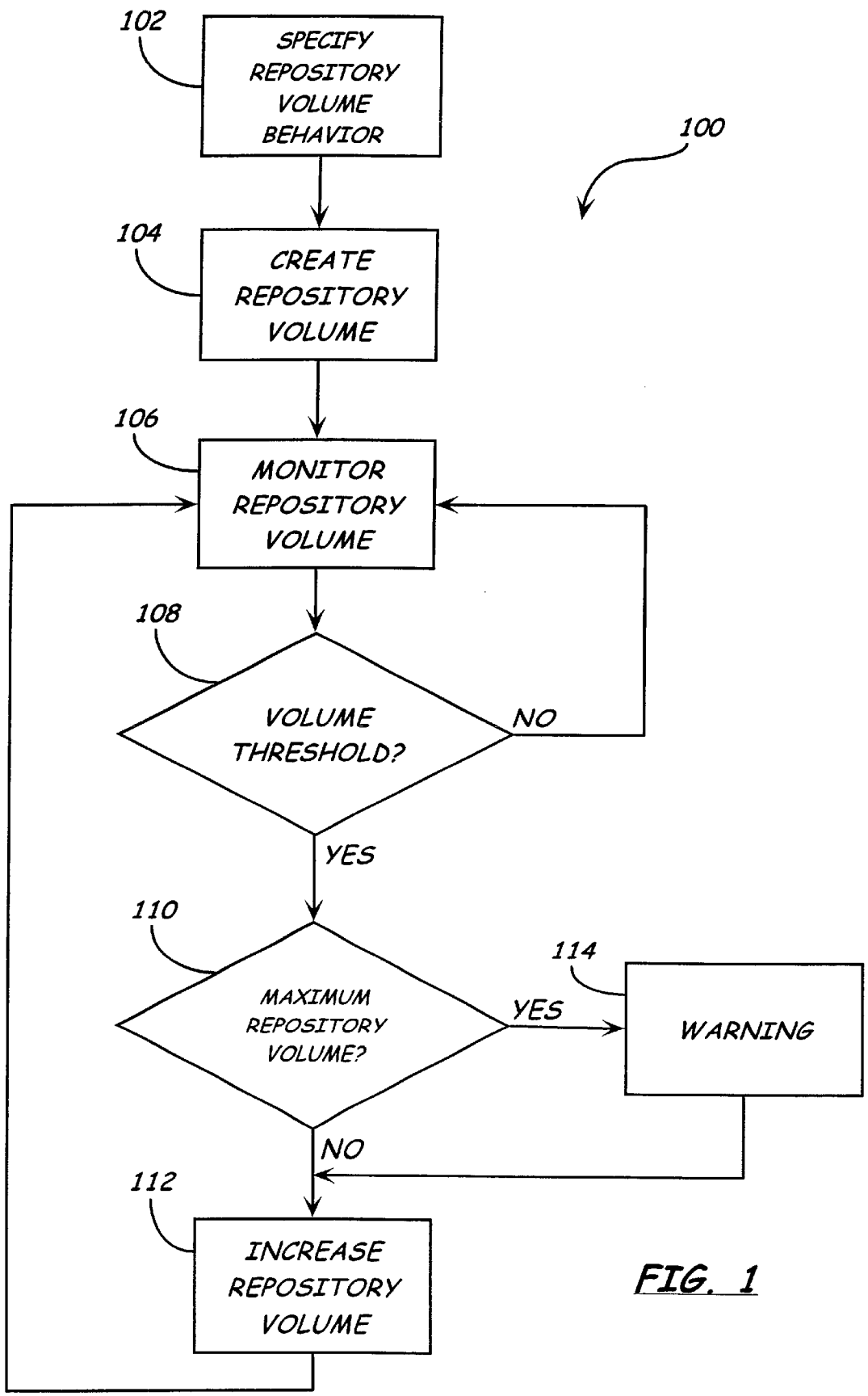
FIG. 1 is a flow diagram illustrating a method for automatically dynamically expanding a snapshot repository volume in accordance with an exemplary embodiment of the present invention.

Referring now to FIG. 1, a method for dynamically expanding a snapshot repository in accordance with an exemplary embodiment of the present invention is described. The method 100 allows the size of the repository volume to be incrementally increased each time the volume reaches a predetermined volume increase threshold, up to a predetermined maximum volume. In exemplary embodiments of the present invention, the expansion behavior of the snapshot directory may be specified 102 at the time the snapshot repository is created 104. This may be accomplished by allowing a user, for example, the system administrator of a storage subsystem such as a RAID system or the like, to define such parameters as the initial size of the snapshot repository volume, the maximum size of the snapshot repository volume, the amount of incremental increase of the snapshot repository volume, the volume increase threshold at which point the size of the snapshot repository volume is increased, the maximum snapshot repository volume threshold at which point a warning that the maximum repository volume is about to be reached is provided, and the like. Preferably, these parameters are stored in the volume definition space of the snapshot repository (see FIG. 3) thereby specifying the behavior of the repository volume. Once the snapshot repository is created 104, it is monitored to determine if the amount of memory utilized by information stored in the snapshot repository has reached a predetermined volume increase threshold 106 (e.g., when the input/output (I/O) mix to the base volume of the snapshot repository consists of more random writes than was initially anticipated). If a determination is made that the amount of memory utilized by information stored in the snapshot repository has not reached the volume increase threshold 108, no action is taken and monitoring of the snapshot repository continues 106. However, if the amount of memory utilized by information stored in the snapshot repository is determined to have reached the volume increase threshold 108, a second determination is made whether the amount of memory utilized by the information stored in the snapshot repository has reached the maximum snapshot repository volume threshold 110. If the amount of memory utilized by the information stored in the snapshot repository has reached the maximum snapshot repository volume threshold 108, the size or volume of the snapshot repository is automatically increased by a predetermined increment 112 and monitoring of the snapshot repository continues 106. If, on the other hand, the amount of memory utilized by the information stored in the snapshot repository has reached the maximum snapshot repository volume threshold 108, a warning that the maximum snapshot repository volume threshold is reached and optionally that the maximum volume is about to be reached is provided to the user 114. In exemplary embodiments of the invention, this warning may be comprised of an electronic mail (e-mail) message, or the like. The size or volume of the snapshot repository is thereafter increased by a predetermined increment 112 if such an increase is possible within the preset maximum volume of the snapshot repository and monitoring of the snapshot repository continues 106.

Figure 2:
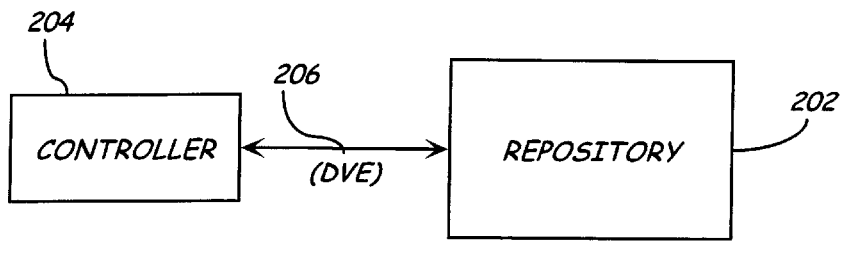
FIG. 2 is a block diagram illustrating a system capable of implementing the exemplary method for automatically dynamically expanding a snapshot repository volume shown in FIG. 1.

Referring now to FIG. 2, an exemplary system capable of implementing the method for dynamically expanding a snapshot repository volume shown in FIG. 1 is described. The system 200 includes a snapshot repository 202 suitable for storing a snapshot and a controller 204 for controlling the behavior of the snapshot repository 202. In exemplary embodiments of the invention wherein the system 200 comprises a memory or storage subsystem such as a RAID system within a networked computer system, the controller 204 may be implemented as firmware of the storage subsystem. Preferably, the controller 204 is capable of monitoring the snapshot repository 202 for determining if the amount of memory utilized by information stored therein has reached a predetermined volume increase threshold (e.g., when the input/output (I/O) mix to the base volume of the snapshot repository 202 consists of more random writes than was initially anticipated) and increasing the volume of the snapshot repository 202 if the volume increase threshold is determined to have been reached. For example, the controller 204 may automatically initiate a Dynamic Volume Expansion (DVE) command routine 206 to increase the size of the snapshot repository 204. The Dynamic Volume Expansion (DVE) feature 206 allows the controller 204 to increase the size of the repository volume 202 provided there is a sufficient amount of unused capacity on the drive group of the storage system. Preferably, the size of the repository volume 202 is increased so that the least amount of data is moved (i.e. so that defragmentation will not necessarily occur). However, other volumes on the drive group may be moved to provide the additional capacity needed by the increased snapshot repository volume 202. The Dynamic Volume Expansion (DVE) feature 206 utilized by the present invention is further described in United States Patent Application titled "Method and System For Expanding Volume Capacity," application Ser. No. 09/722,892, filed Nov. 27, 2000, which is herein incorporated by reference in its entirety.

The controller 204 may further monitor the snapshot repository 202 for determining if the amount of memory utilized by information stored in the snapshot repository 202 has reached a predetermined maximum snapshot repository volume threshold (see FIG. 3) and provide a warning, such as an electronic mail (e-mail) message, or the like, if the maximum snapshot repository volume threshold is reached and optionally that the maximum volume is about to be reached. For instance, the Dynamic Volume Expansion (DVE) command routine 206, once initiated, may continue to run automatically on the snapshot repository 202 as needed until the maximum snapshot repository volume is reached.

In exemplary embodiments of the present invention, the controller 204 may allow the expansion behavior of the snapshot directory to be specified at the time the snapshot repository is created. This may be accomplished by allowing a user, for example, the system administrator, or the like, to define such parameters as the initial size of the snapshot repository volume, the maximum size of the snapshot repository volume, the amount of incremental increase of the snapshot repository volume, the volume increase threshold at which point the size of the snapshot repository volume is increased, the maximum snapshot repository volume threshold at which point a warning that the maximum repository volume is about to be reached is provided, and the like. Preferably, the controller then stores these parameters in the volume definition space (see FIG. 3) of the snapshot repository 202 thereby specifying the behavior of the repository volume. In this manner, the present invention allows the system administrator to specify the behavior of a repository volume at the time it is created so that the system 200 may thereafter provide automatic scaling of the repository volume so that the exact initial size of the repository volume need not be known.

Figure 3:
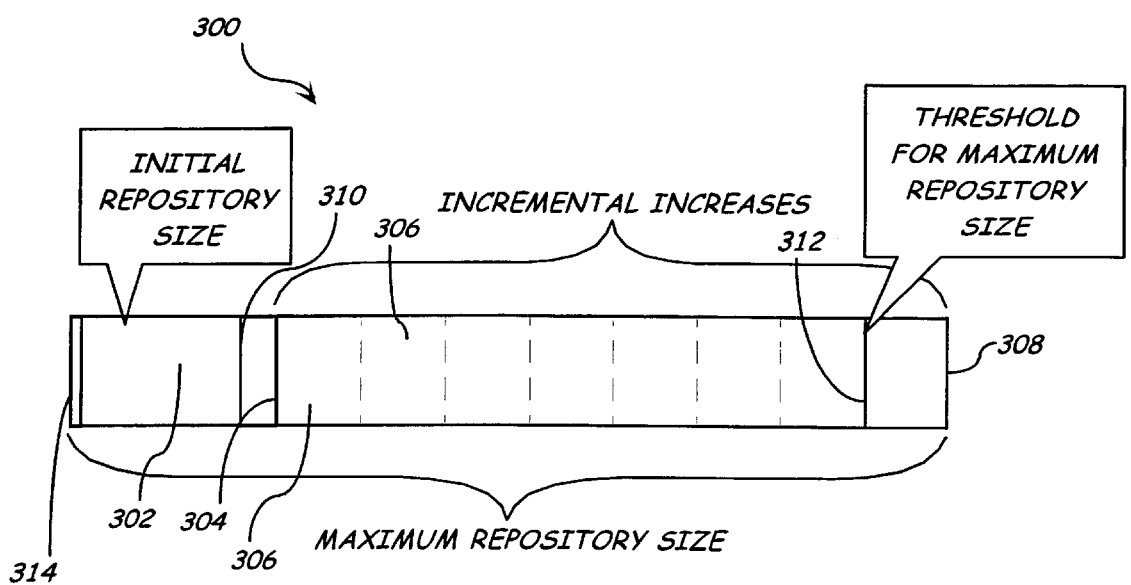
FIG. 3 is a schematic diagram illustrating an exemplary snapshot repository in accordance with the present invention.

Referring now to FIG. 3, an exemplary dynamic snapshot repository in accordance with an exemplary embodiment of the present invention is described. The snapshot repository 300 includes a base repository volume 302 having an initial size 304 that may be increased by adding increments of memory 306 up to a predetermined maximum volume 308. As discussed supra, the expansion behavior of the snapshot repository 300 may be specified at the time it is created. This may be accomplished by allowing a user, for example, the system administrator, to define parameters specifying the initial size of the snapshot repository volume 304, the maximum size of the snapshot repository volume 308, the amount of incremental increase of the snapshot repository volume 306, the volume increase threshold 310, the maximum snapshot repository volume threshold 312, and the like. These parameters may be defined in a variety of ways depending on the storage system. For instance, in embodiments of the invention, a user may be allowed to define the initial size of the snapshot repository volume 304 and the maximum size of the snapshot repository 308 as a proportion or percentage of the available free memory of the storage system (e.g., 10% and 20%, respectively) or as a fixed amount of memory (e.g., 30 GB and 60 GB, respectively). Similarly, the amount of incremental increase of the snapshot repository volume 306 may be defined as a proportion or percentage of the available free memory of the storage system (e.g., 2%), as a fixed amount of memory (e.g., 30 GB, 60 GB and 6 GB, respectively), or as a proportion or percentage of the initial snapshot repository volume 302 (e.g., 20%). Further, the volume increase threshold 310 may be defined as a proportion or percentage of the snapshot repository volume 302 (e.g., 70% full) while the maximum snapshot repository volume threshold 312 may be defined as a proportion or percentage of the maximum size of the snapshot repository 308 (e.g., 80% full). The user may wish to set the initial repository size 304 to a "good" estimate and the increase amount to a reasonably small value (e.g., 20% of the initial snapshot repository volume 302) and then allow the snapshot repository 300 to grow to the exact size of the base volume. In this manner, the snapshot repository 300 will never exceed its maximum capacity. Thus, in one example, a user may specify the behavior of the snapshot repository 302 by creating the repository volume to have the following parameters:

the initial size of the snapshot repository volume 304=30 GB, the maximum size of the snapshot repository volume 308=60 GB, the amount of incremental increase of the snapshot repository volume 306=20% of the initial snapshot repository volume 302, the volume increase threshold 310=70% of the snapshot repository volume 302, and the maximum snapshot repository volume threshold 312=80% of the maximum size of the snapshot repository 308 which are stored in the volume definition space 314 for the snapshot repository 300. The snapshot repository 300 is monitored to determine if the amount of memory utilized by information stored in the initial snapshot repository 302 has reached the volume increase threshold 310 (e.g., when the input/output (I/O) mix to the base volume of the snapshot repository 302 consists of more random writes than was initially anticipated). If the amount of memory utilized by information stored in the snapshot repository is determined to have reached the volume increase threshold 310 (i.e., 70% of the initial snapshot repository volume 302 of 30 GB), the size of the snapshot repository volume 300 is automatically increased by the predetermined increment 306. Thus, the size of the base snapshot repository volume 302 would be increased by 20% from 30 GB to 36 GB. The snapshot repository 300 is again monitored to determine if the amount of memory utilized by information stored in the initial base snapshot repository 302 has reached the volume increase threshold 310 (i.e., 70% of the expanded base snapshot repository volume 302 of 36 GB) at which time the size of the snapshot repository volume 300 is again automatically increased by the predetermined increment 306 (i.e., to 42 GB). This continues until the maximum snapshot repository volume 308 (e.g., 60 GB) is reached. When the amount of memory utilized by the information stored in the snapshot repository has reached the maximum snapshot repository volume threshold 312 (e.g., 80% of the maximum size of the snapshot repository 308 or 48 GB) at which time a warning that the maximum snapshot repository volume is about to be reached is provided to the user 114.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory of one or more information appliances or devices. Until required by the device, the set of instructions may be stored in another readable memory device, for example in a hard disk drive or in a removable memory such as an optical disk for utilization in a CD-ROM drive, a floppy disk for utilization in a floppy disk drive, a floppy/optical disk for utilization in a floppy/optical drive, or a personal computer memory card for utilization in a personal computer card slot. Further, the set of instructions can be stored in the memory of a device and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions such as software or firmware readable by a device such as a computer system, server, storage system, or the like. Further, it is understood that the specific order or hierarchies of steps in the methods disclosed are examples of exemplary approaches. Based upon design preferences, it is understood that the specific order or hierarchy of steps in the method can be rearranged while remaining within the scope of the present invention. The attached method claims present elements of the various steps in a sample order, and are not meant to be limited to the specific order or hierarchy presented.

It is believed that the system and method for dynamically expanding a snapshot repository volume of the present invention and many of their attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for dynamically expanding a snapshot repository, comprising:

creating a snapshot repository having an initial volume;

specifying the behavior of the snapshot repository, comprising at least one of:

defining an initial size of the snapshot repository volume;

defining a maximum size of the snapshot repository volume;

defining an amount of incremental increase of the snapshot repository volume; and defining the volume increase threshold; monitoring the snapshot repository for determining if the amount of memory utilized by information stored in the snapshot repository has reached a predetermined volume increase threshold; and increasing the volume of the snapshot repository if the volume increase threshold is determined to have been reached.

2. The method as claimed in claim 1, further comprising:

monitoring the snapshot repository for determining if the amount of memory utilized by information stored in the snapshot repository has reached a predetermined maximum snapshot repository volume threshold; and providing a warning if the maximum snapshot repository volume threshold is reached.

3. The method as claimed in claim 2, further comprising specifying the behavior of the snapshot repository by defining the maximum snapshot repository volume.

4. The method as claimed in claim 2, wherein the warning comprises an electronic mail (e-mail) message.

5. The method as claimed in claim 1, wherein increasing the volume of the snapshot repository comprises initiating a Dynamic Volume Expansion (DVE) for increasing the size of the snapshot repository volume.

6. A system for dynamically expanding a snapshot repository, comprising:

means for creating a snapshot repository having an initial volume;

means for specifying the behavior of the snapshot repository, the means for specifying the behavior of the snapshot repository being capable of at least one of:
defining an initial size of the snapshot repository volume,
defining a maximum size of the snapshot repository volume,
defining an amount of incremental increase of the snapshot repository volume, and
defining the volume increase threshold;

means for monitoring the snapshot repository for determining if the amount of information stored in the snapshot repository has reached a predetermined volume increase threshold; and means for increasing the volume of the snapshot repository if the volume increase threshold is determined to have been reached.

7. The system as claimed in claim 6, further comprising:

means for monitoring the snapshot repository for determining if the amount of information stored in the snapshot repository has reached a predetermined maximum snapshot repository volume; and means for providing a warning if the maximum snapshot repository volume is reached.

8. The system as claimed in claim 7, further comprising means for specifying the behavior of the snapshot repository by defining the maximum snapshot repository volume.

9. The system as claimed in claim 7, wherein the warning comprises an electronic mail (e-mail) message.

10. The system as claimed in claim 6, wherein the means for increasing the volume of the snapshot repository initiates a Dynamic Volume Expansion (DVE) for increasing the size of the snapshot repository volume.

11. A system for storing a snapshot of a memory, comprising:

a snapshot repository suitable for storing the snapshot; and a controller for controlling the snapshot repository, the controller allowing an initial volume of the snapshot repository to be defined and a snapshot repository behavior to be specified, the snapshot repository behavior comprising at least one of:
an initial size of the snapshot repository volume;
a maximum size of the snapshot repository volume;
an amount of incremental increase of the snapshot repository volume;
the volume increase threshold; and
the maximum snapshot repository volume;

wherein the controller monitors the snapshot repository for determining if the amount of information stored in the snapshot repository has reached a predetermined volume increase threshold and increases the volume of the snapshot repository if the volume increase threshold is determined to have been reached.

12. The system as claimed in claim 11, wherein the controller monitors the snapshot repository for determining if the amount of information stored in the snapshot repository has reached a predetermined maximum snapshot repository volume and provides a warning if the maximum snapshot repository volume is reached.

13. The system as claimed in claim 11, wherein the warning comprises an electronic mail (e-mail) message.

14. The system as claimed in claim 11, wherein the controller increases the volume of the snapshot repository by initiating a Dynamic Volume Expansion (DVE).

* * * * *